United States Patent [19]

Shanley, II

[11] 4,438,454
[45] Mar. 20, 1984

[54] ADJUSTABLE CORING CIRCUIT PERMITTING CORING EXTINCTION

[75] Inventor: Robert L. Shanley, II, Indianapolis, Ind.

[73] Assignee: RCA Corporation, New York, N.Y.

[21] Appl. No.: 460,846

[22] Filed: Jan. 25, 1983

Related U.S. Application Data

[63] Continuation-in-part of Ser. No. 363,856, Mar. 31, 1982.

[51] Int. Cl.³ .......................................... H04N 9/535
[52] U.S. Cl. .................................... 358/31; 307/500; 328/143
[58] Field of Search .......................... 358/21 R, 31, 37; 357/24; 307/221 D, 230, 304; 328/142, 143, 166

[56] References Cited

U.S. PATENT DOCUMENTS

| | | | |
|---|---|---|---|
| 4,167,749 | 9/1979 | Burrus | 358/8 |
| 4,223,340 | 9/1980 | Bingham et al. | 358/31 |

OTHER PUBLICATIONS

Article by J. P. Rossi, entitled "Digital Techniques for Reducing Television Noise", appearing on pp. 134-140 of Mar., 1978 issue of SMPTE Journal.
Article by R. H. McMann, et al., entitled "Improved Signal Processing Techniques for Color Television Broadcasting", appearing on pp. 221-228 of Mar., 1968 issue of SMPTE Journal.

*Primary Examiner*—Richard Murray
*Attorney, Agent, or Firm*—Eugene M. Whitacre; Paul J. Rasmussen; William H. Meagher

[57] ABSTRACT

Adjustable coring circuit includes linear amplifier and multistage limiting amplifier responsive to input signals from a common source. Limiting amplifier includes an input stage receiving operating current from a first current source transistor, in cascade with an output stage receiving operating current from a second current source transistor. Cored signal, corresponding to the difference between a linearly translated version of the input signals and a doubly clipped version thereof, is developed by a signal combiner responsive to outputs of both amplifiers. Base-emitter paths of the two current source transistors are connected in series across a common bias source. The base electrodes of two control transistors, of mutually opposite conductivity types, respond to variations of common coring level control voltage. Collector-emitter path of one control transistor shunts base-emitter path of first current source transistor. Emitter-collector path of other control transistor, which shunts the common bias source, is nonconducting over major portion of variation range of coring level control voltage.

6 Claims, 1 Drawing Figure

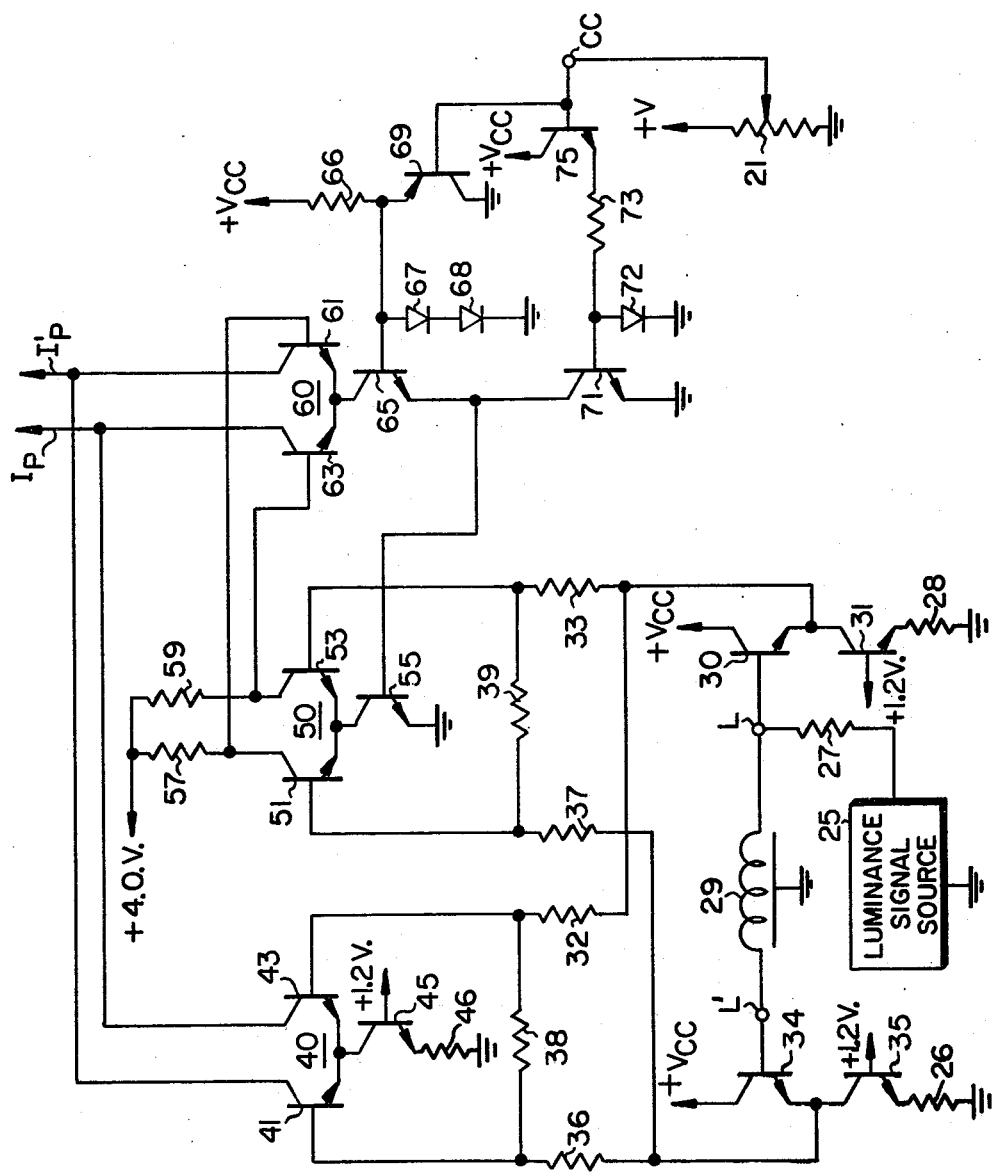

ADJUSTABLE CORING CIRCUIT PERMITTING CORING EXTINCTION

This application is a continuation-in-part of U.S. patent application, Ser. No. 363,856, filed Mar. 31, 1982. The present invention relates generally to adjustable coring circuits, and particularly to coring circuits of a novel form wherein a system for control of the coring level extinguishes the coring action at one extreme of the coring level control range.

In the copending U.S. patent application of L. A. Harwood, et al. entitled "Adjustable Coring Circuit", concurrently filed herewith, a coring circuit is described in which signals are supplied to the inputs of a linear signal translator and a non-linear signal translator. The non-linear signal translator comprises a multistage limiting amplifier, which develops a doubly clipped version of the input signals for combination in antiphasal relationship with a linearly amplified version of the input signals provided by the linear signal translator. The combined signals form a cored version of the input signals, with the level of coring subject to adjustment via variation of the distribution of gain between respective cascaded stages of the multistage limiting amplifier. The gain distribution variation is desirably effected without significant disturbance of the overall gain of the limiting amplifier, which is set to be substantially equal to the gain of the linear signal translator to ensure the accuracy of core cancellation in the combiner at a plurality of selected coring levels.

In an illustrative embodiment of the coring system of the aforementioned copending patent application, a first current source transistor that supplies the operating current for the output stage of the limiting amplifier has its emitter electrode returned to the base electrode of a second current source transistor that supplies the operating current for the input stage of the limiting amplifier. The base-emitter paths of the respective current source transistors are connected in series across a bias voltage source which forward biases the respective base-emitter junctions. The collector-emitter path of a control transistor is shunted across the base-emitter path of the second current source transistor. Forward biasing of the base-emitter junction of the control transistor is subjected to variation in accordance with a coring level control voltage.

In use of such a coring system, the minimum coring level extreme of the coring level control range coincides with complete elimination of forward bias for the base-emitter junction of the control transistor. A finite residual coring level will, however, be associated with this extreme of the coring level control range.

In accordance with the principles of the present invention, a modification of the above-described coring system is effected to permit extinction of coring action to be automatically obtained at the minimum coring level extreme of the coring level control range.

In accordance with an illustrative embodiment of the present invention, the coring level control system utilizes a second control transistor in addition to the above-described control transistor, with the respective control transistors being of opposite conductivity types. The emitter electrode of the second control transistor is connected to the base electrode of the current source transistor of the limiter output stage, and the emitter-collector path of the second control transistor is shunted across the series combination of the base-emitter paths of the two current source transistors. The base electrode of the second control transistor is rendered responsive to the same coring level control voltage that is used to variably bias the first control transistor. Over a wide portion of the coring level control range, the base-emitter junction of the second control transistor is reverse biased. Under such circumstances, the second control transistor is cut off, and operation of the adjustable coring is unaffected thereby. In the vicinity of the minimum coring level extreme of the coring level control range, however, the base-emitter path of the second control transistor becomes forward biased. Strong conduction by the second control transistor when the minimum coring level extreme of the coring level control range is reached effects a disabling of the limiting amplifier, permitting extinction of the coring action.

In the accompanying drawing, the sole FIGURE illustrates, partially schematically and partially by block representation, a portion of a television receiver in which adjustable coring of a horizontal peaking signal is effected by apparatus constructed in accordance with an illustrative embodiment of the present invention.

To develop the peaking signal which is to be processed by circuitry embodying the principles of the present invention, the output of a luminance signal source 25 (e.g., in a color television receiver use, constituted by the luminance signal output of the receiver's comb filter) is coupled via a resistor 27 to the input terminal (L) of a delay line 29. Illustratively, the delay line 29 is a wideband device exhibiting a linear phase characteristic over the frequency band occupied by the signals from source 25 (e.g., extending to b 4.0 MHz.), and provides a signal delay of 140 nanoseconds. The input end of delay line 29 is terminated (e.g., through the aid of resistor 27) in an impedance substantially matching its characteristic impedance, whereas the output end of the delay line (at terminal L') is misterminated to obtain a reflective effect. The signals appearing at the respective ends of the delay line 29 are thus: (a) a once-delayed luminance signal at terminal L'; and (b) the sum of an undelayed luminance signal and a twice-delayed luminance signal at terminal L. The difference between the respective signals at terminals L and L' corresponds to an appropriate horizontal peaking signal for addition to the luminance signal to enhance its horizontal detail (by effectively boosting luminance components in a frequency range from 1.75 MHz. to 5.25 MHz., −6 db points, with a maximum boost at 3.5 MHz.).

Differential amplifier 40, accepting signals from terminals L and L' at its respective differential inputs, provides a linear amplification channel for such a peaking signal. Amplifier 40 includes a pair of NPN transistors 41, 43 with interconnected emitter electrodes returned to a point of reference potential (e.g., ground) via the collector-emitter path of an NPN current source transistor 45 in series with emitter resistor 46. The base electrode of transistor 45 is connected to the positive terminal (+1.2 V.) of a bias potential supply to establish a desired operating current for amplifier 40.

Signals from terminal L' are supplied to the base electrode of transistor 41 via the base-emitter path of an NPN emitter-follower transistor 34 and a series coupling resistor 36. The collector electrode of transistor 34 is directly connected to the positive terminal (+Vcc) of an operating potential supply, while the emitter electrode of transistor 34 is returned to ground via the collector-emitter path of a current source transistor 35

(having its base electrode connected to the +1.2 V. bias supply terminal) in series with emitter resistor 26. Signals from terminal L are supplied to the base electrode of transistor 43 via the base-emitter path of an NPN emitter-follower transistor 30 and a series coupling resistor 32. The collector electrode of transistor 30 is directly connected to the +Vcc supply terminal, while the emitter electrode of transistor 30 is returned to ground via the collector-emitter path of a current source transistor 31 (having its base electrode connected to the +1.2 V. bias supply terminal) in series with emitter resistor 28. While direct connections are illustrated between the respective terminals L, L' and the bases of emitter-follower transistors 30, 34, additional emitter-followers (not shown) may desirably be interposed in the respective connections to elevate the impedances presented to the respective terminals.

A resistor 38 interconnects the base electrodes of transistors 41, 43, and cooperates with the coupling resistors 36, 32 to introduce a degree of attenuation of the input signals that ensures that the maximum signal difference between base potentials is accommodated within the linear signal handling range of amplifier 40. The respective collector electrodes of transistors 41 and 43 are linked to the positive terminal of an operating potential supply by respective loads (not shown) which are shared by the limiting amplifier's outputs. The respective collector currents of transistors 41 and 43 vary in accordance with oppositely phased versions of the peaking signals.

Differential amplifier 50, accepting signals from terminals L and L' at its respective differential inputs, serves as the input stage of a limiting amplifier providing a non-linear amplification channel for the peaking signal. Amplifier 50 includes a pair of NPN transistors 51, 53 with interconnected emitter electrodes returned to ground via the collector-emitter path of an NPN current source transistor 55. Signals from terminal L', appearing at the output of emitter-follower transistor 34, are supplied to the base electrode of transistor 51 via a series coupling resistor 37. Signals from terminal L, appearing at the output of emitter-follower transistor 30, are supplied to the base electrode of transistor 53 via a series coupling resistor 33. A resistor 39 interconnects the base electrodes of transistors 51 and 53. The input signal attenuation provided by the network of resistors 37, 39, 33 is less than the attenuation provided by the linear amplifier's network (36, 38, 32), and permits the maximum signal swing between bases to exceed the linear signal handling range of amplifier 50.

The collector electrodes of transistors 51 and 53 are individually connected by respective load resistors (57, 59) to the positive terminal (+4.0 V.) of an operating potential supply. Oppositely phased peaking signals (with maximum excursions clipped) appear across the respective load resistors 57 and 59.

Differential amplifier 60, serving as the output stage of the limiting amplifier and providing further clipping of the peaking signals, includes a pair of NPN transistors 61 and 63 with interconnected emitters connected to the collector electrode of a current source transistor 65. The emitter electrode of transistor 65 is returned to ground via the base-emitter path of current source transistor 55. The base electrode of transistor 61 is directly connected to the collector electrode of transistor 51 of the input stage, while the base electrode of transistor 63 is directly connected to the collector electrode of transistor 53 of the input stage.

The collector electrode of transistor 61 is directly connected to the collector electrode of transistor 41 of the linear amplifier so that the summed collector currents of transistors 41 and 61 form a cored peaking signal current (Ip'). The collector electrode of transistor 63 is directly connected to the collector electrode of transistor 43 of the linear amplifier so that the summed collector currents of transistors 43 and 63 form a cored peaking signal current Ip (an oppositely phased version of Ip').

A resistor 66 is connected between the positive terminal (+3.2 V.) of a bias potential supply and the anode of a diode 67, the cathode of which is directly connected to the anode of a second diode 68. The cathode of diode 68 is directly connected to ground, so that the pair of diodes 67, 68 are forward biased by the bias potential supply. The anode of diode 67 is directly connected to the base electrode of current source transistor 65, so that the voltage appearing across the diode pair (67, 68) is applied across the serially disposed base-emitter paths of current source transistors 65, 55 to forward bias their base-emitter junctions.

The collector electrode of an NPN control transistor 71 is directly connected to the base electrode of transistor 55. The emitter electrode of transistor 71 is directly connected to ground, disposing the collector-emitter path of transistor 71 directly in shunt with the base-emitter path of the input stage's current source transistor 55.

A coring control voltage input terminal CC is connected to the base electrode of an NPN emitter-follower transistor 75 (having its collector electrode directly connected to the +Vcc supply terminal). The emitter electrode of transistor 75 is connected via resistor 73 to the base electrode of transistor 71, and to the anode of a diode 72. The cathode of diode 72 is directly connected to ground, disposing diode 72 directly in shunt with the base-emitter path of control transistor 71. A positive coring control voltage applied to terminal CC controls the biasing of control transistor 71 to vary the conductance of its collector-emitter path and thereby adjust the level of coring attained in the output signal currents Ip and Ip', As described to this point, the coring system of the drawing is identical with that described in the aforementioned copending patent application. An addition to the system of the copending application is constituted by the PNP control transistor 69, disposed with its emitter electrode directly connected to the base electrode of current source transistor 65. The collector electrode of transistor 69 is returned directly to ground, placing the emitter-collector path of transistor 69 directly in shunt with the series combination of the base-emitter paths of the two current source transistors 65, 55. The base electrode of control transistor 69 is directly connected to the coring control voltage input terminal CC.

The coring control voltage source is illustratively shown in the drawing as a manually controlled potentiometer 21, with its adjustable tap directly connected to terminal CC, and with its fixed end terminals connected respectively to the positive terminal (+V) of a DC voltage source, and to the grounded negative terminal thereof. Illustratively, the potential at the +V terminal is appreciably larger than the (2 $V_{be}$) potential developed across the series combination of diodes 67, 68. Thus, the base-emitter junction of PNP transistor 69 remains reverse biased over a large portion of the tap adjustment range (when the control potential selected by the tap exceeds the 2 $V_{be}$ potential). Over the large portion of the adjustment range, the PNP control transistor 69 is cut off, and operation of the adjustable coring system is as described in the aforementioned copending application, and as set forth immediately below.

The base-emitter path of transistor 65 forms a voltage divider with the parallel combination of (a) the base-emitter path of transistor 55, and (b) the collector-emitter path of transistor 71, to effect a division of the bias voltage appearing across the series-connected diodes 67, 68, with the division ratio dependent upon the conductance of NPN control transistor 71. When the shunting impedance presented by transistor 71 decreases (due to an increase in the coring control voltage), the base-emitter voltage ($V_{be}$) of current source transistor 55 decreases, accompanied by a complementary increase of the base-emitter voltage of current source transistor 65. When the shunting impedance presented by transistor 71 increases (due to a decrease in the coring control voltage), the $V_{be}$ of transistor 55 increases, accompanied by a complementary decrease of the $V_{be}$ of transistor 65.

The consequence of a variation of the coring control voltage is thus an introduction of complementary variations in the operating currents of differential amplifiers 50 and 60, and, hence, complementary variations of the respective gains of the two cascaded stages of the limiting amplifier. With variation of the DC impedance presented by transistor 71 having a negligible effect on the bias voltage appearing across diodes 67, 68, the overall gain of the limiting amplifier, proportional to the product of the magnitudes of the respective stage's operating current, remains substantially undisturbed as the distribution of gain between respective stages is varied. For accuracy of coring, this undisturbed magnitude of overall gain is set so that the gain of the respective non-linear and linear amplification channels are substantially identical.

A gain distribution change (caused by a decrease in coring control voltage) that elevates input stage (50) gain results in a clipping by the output stage (60) that is closer to the axis, and thus reduces the coring level. Conversely, a gain distribution change (caused by an increase in coring control voltage) that depresses input stage gain increases the coring level.

As the position of the adjustable tap approaches the grounded end terminal of potentiometer 21, however, the biasing of the base-emitter junction of the PNP control transistor 69 shifts to the forward direction, and conduction in the emitter-collector path of transistor 69 occurs. At the control range extreme that places the tap at ground potential, this conduction is sufficiently great as to result in cutoff of the current source transistors 65, 55, and consequent extinction of the coring of the horizontal peaking signals.

What is claimed is:

1. A system for effecting an adjustable amount of coring of signals derived from a source comprising:

first signal translating means, having an input coupled to said source, for linearly translating said signals;

second signal translating means, having an input coupled to said source, for non-linearly translating said signals; said second signal translating means comprising a multistage limiting amplifier for developing a limited version of said signals, said limiting amplifier including respective input and output amplifying stages coupled in cascade;

means, responsive to the outputs of said first and second signal translating means, for developing a cored version of said signals corresponding to the difference between a linearly translated version of said signals and a limited version of said signals;

a bias voltage source;

a first current source transistor, having base, emitter and collector electrodes, for supplying operating current to said input amplifying stage;

a second current source transistor, having base, emitter and collector electrodes, for supplying operating current to said output amplifying stage;

means for connecting the respective base-emitter path of said first and second current source transistors in series across said bias voltage source;

first and second control transistors, each having base, emitter and collector electrodes, said first and second control transistors being of mutually opposite conductivity types;

means for connecting the collector-emitter path of said first control transistor in shunt with the base-emitter path of said first current source transistor;

means for connecting the emitter-collector path of said second control transistor in shunt with the series combination of the base-emitter paths of said first and second current source transistors;

a source of variable DC voltage; and means for rendering the base electrodes of both of said first and second control transistors responsive to said variable DC voltage.

2. Apparatus in accordance with claim 1 wherein the polarity of said variable DC voltage is such as to effect variable forward biasing of the base-emitter junction of said first control transistor.

3. Apparatus in accordance with claim 2 wherein the range of variation of said variable DC voltage is such that said second control transistor is maintained in a nonconducting state in response to values of said variable DC voltage over a major portion of said variation range.

4. Apparatus in accordance with claim 1 wherein said current source transistors are of the same conductivity type as said first control transistor.

5. Apparatus in accordance with claim 4 wherein each of said amplifying stages comprises a differential amplifier including a pair of transistors, of the same conductivity type as said first control transistor, with interconnected emitter electrodes connected to the collector electrode of a respective one of said current source transistors.

6. Apparatus in accordance with claim 1, for use with a source of luminance signals in a television receiver, wherein the signals subject to coring comprise horizontal peaking signals derived from said luminance signal source.

* * * * *

UNITED STATES PATENT AND TRADEMARK OFFICE
CERTIFICATE OF CORRECTION

PATENT NO. : 4,438,454

DATED : March 20, 1984

INVENTOR(S) : Robert Loren Shanley, II

It is certified that error appears in the above-identified patent and that said Letters Patent is hereby corrected as shown below:

Column 6, line 21, the word that reads "path" should read -- paths --.

Signed and Sealed this

Fourth Day of September 1984

[SEAL]

Attest:

GERALD J. MOSSINGHOFF

Attesting Officer

Commissioner of Patents and Trademarks